(12) United States Patent
Schallenberg et al.

(10) Patent No.: US 12,443,473 B2
(45) Date of Patent: Oct. 14, 2025

(54) METHOD FOR PERFORMING A TECHNICAL PROCESS IN REGULAR OPERATION AND REPAIR OPERATION

(71) Applicant: Siemens Mobility GmbH, Munich (DE)

(72) Inventors: Andreas Schallenberg, Peine (DE); Stefan Gerken, Braunschweig (DE); Matthias Bolz, Braunschweig (DE); Uwe Eckelmann-Wendt, Wolfenbüttel (DE); Faustino Frechilla Daza, Madrid (ES); Fernando Meya Delfa, Madrid (ES); Jose Luis Garcia Cano, Madrid (ES)

(73) Assignee: Siemens Mobility Gmbh, Munich (DE)

( * ) Notice: Subject to any disclaimer, the term of this patent is extended or adjusted under 35 U.S.C. 154(b) by 0 days.

(21) Appl. No.: 18/820,696

(22) Filed: Aug. 30, 2024

(65) Prior Publication Data
US 2025/0077322 A1  Mar. 6, 2025

(30) Foreign Application Priority Data
Aug. 30, 2023  (EP) .................................. 23194137

(51) Int. Cl.
*G06F 9/54*     (2006.01)
*B61L 27/50*    (2022.01)
*G06F 9/48*     (2006.01)

(52) U.S. Cl.
CPC .............. *G06F 9/546* (2013.01); *B61L 27/50* (2022.01); *G06F 9/485* (2013.01)

(58) Field of Classification Search
None
See application file for complete search history.

(56) References Cited

U.S. PATENT DOCUMENTS

| | | | | |
|---|---|---|---|---|
| 5,742,753 A | * | 4/1998 | Nordsieck | G06F 11/1625 714/24 |
| 10,095,601 B2 | | 10/2018 | De Oliveira et al. | |
| 12,030,535 B2 | | 7/2024 | Eckelmann-Wendt et al. | |

(Continued)

FOREIGN PATENT DOCUMENTS

| | | | | |
|---|---|---|---|---|
| CN | 101799782 A | * | 8/2010 | .............. G06F 11/18 |
| EP | 0768776 A1 | | 4/1997 | |

(Continued)

OTHER PUBLICATIONS

Gamer et al. "Increasing Efficiency of M out of N" IEEE.*

*Primary Examiner* — Charles E Anya
(74) *Attorney, Agent, or Firm* — Laurence A. Greenberg; Werner H. Stemer; Ralph E. Locher

(57) ABSTRACT

A method for performing a technical process in which application programs are executed redundantly in a plurality N of computing instances and, on the basis of an MooN system, wherein M is at least two and N is at least three, a comparison of the plurality N of results of the redundant execution of the application programs is performed in a voting. When a minority of the results is different from a majority of the results with identical content, the minority is excluded during the performance of the technical process, is repaired with a state copy of one of the intact computing instances and reintegrated into the process. There is also described a computer program product and a provisioning apparatus.

18 Claims, 6 Drawing Sheets

(56) References Cited

U.S. PATENT DOCUMENTS

| | | | | |
|---|---|---|---|---|
| 2003/0009511 | A1* | 1/2003 | Giotta | G06F 9/54 709/201 |
| 2019/0188080 | A1* | 6/2019 | Cape | G06F 11/3409 |
| 2024/0320050 | A1* | 9/2024 | Lai | G06F 9/3861 |

FOREIGN PATENT DOCUMENTS

| | | | | |
|---|---|---|---|---|
| EP | 2884392 A1 * | 6/2015 | | G06F 11/3672 |
| EP | 3676991 A1 | 7/2020 | | |
| EP | 4009173 A1 | 6/2022 | | |
| FR | E.P. NO. 2884392 A1 * | 6/2015 | | G06F 11/1484 |
| WO | WO-8706037 A1 * | 10/1987 | | G06F 11/184 |

* cited by examiner

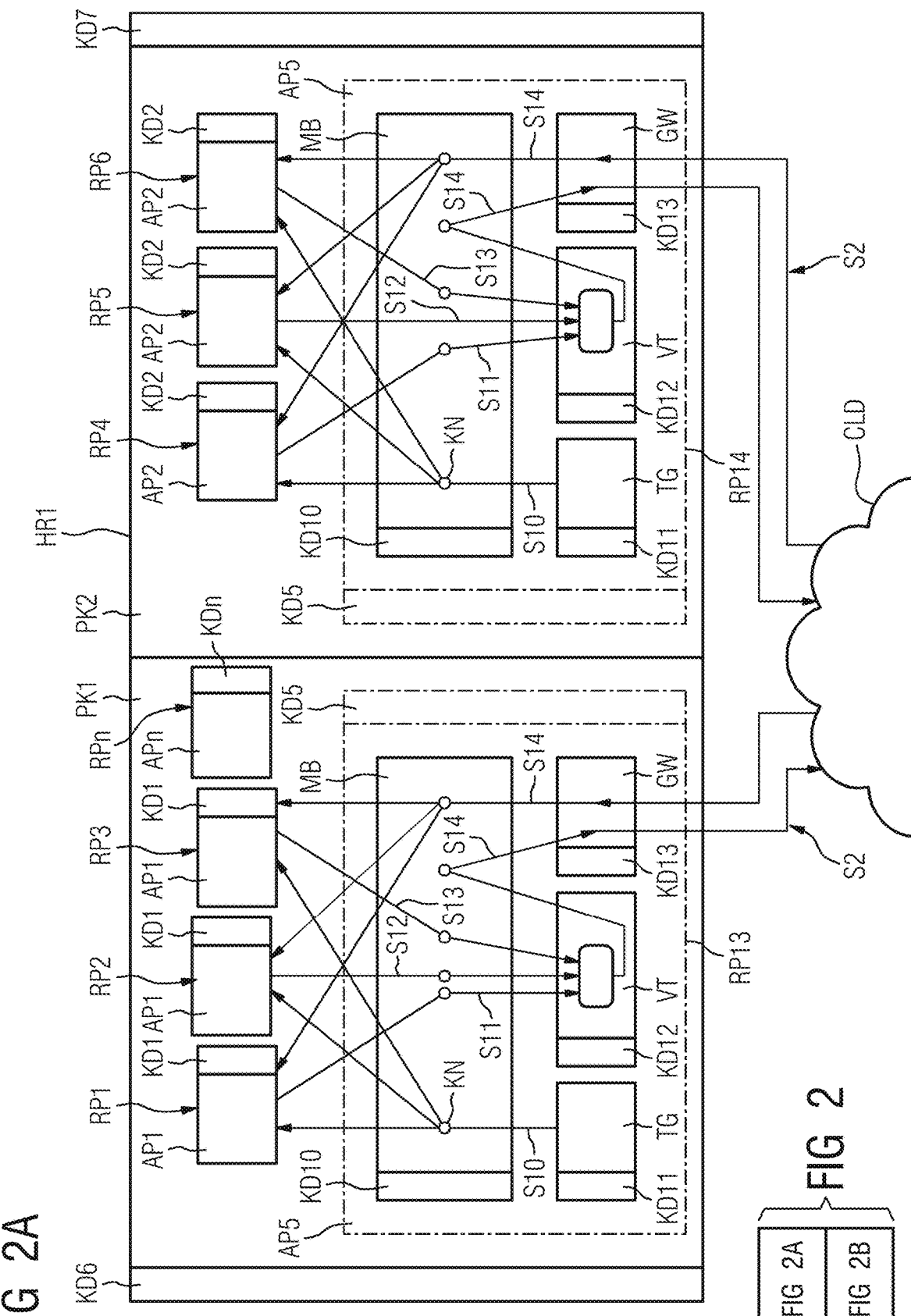

METHOD FOR PERFORMING A TECHNICAL PROCESS IN REGULAR OPERATION AND REPAIR OPERATION

CROSS-REFERENCE TO RELATED APPLICATION

This application claims the priority, under 35 U.S.C. § 119, of European Patent Application EP 23194137.8, filed Aug. 30, 2023; the prior application is herewith incorporated by reference in its entirety.

FIELD AND BACKGROUND OF THE INVENTION

The invention pertains to a method for performing a technical process. Furthermore, the invention pertains to a computer program product with program instructions and to a provisioning apparatus for providing the computer program product.

Railroad automation systems, i.e., communication networks or control systems used in the field of railroad automation, have to meet high requirements for the correct and reliable functioning of the components and transmission of messages, for example in the form of control information, during operation. The reason for this is that the corresponding processes (computing operations, data storage, message transmission) have a direct impact on operational reliability, which is also referred to as "safety." Corresponding railroad automation systems usually consist of at least one control unit that controls a plurality of terminal devices or requests information from them and uses a corresponding communication network for this purpose. Here, railroad automation systems are characterized by the fact that they usually comprise a large number of devices or units and are often geographically dispersed, resulting in a distributed system with components at different locations.

European published patent application EP 3676991 A1 describes, for example, that at least the transmission of messages during the operation of railroad automation systems can be performed according to a publish/subscribe method in order to offer reliable transmission technology that ensures greater flexibility in terms of configuration and scalability.

In order to safeguard safety-relevant computing environments, it is also known that only those components that are used to process the relevant application are reliably installed on a computer in a plurality of computing instances. If the application then runs in parallel in a plurality of computing instances, voting can be used in a known manner to determine whether errors occur during the calculation; this can also detect memory errors.

Another document describes a method and a computer which has a test algorithm for processing applications in the computing environment formed by the computer. Application programs which are executed redundantly are installed on the computer so that the test algorithm has the possibility of detecting errors by comparing the calculation results (as mentioned, also called voting).

However, this method involves a significant outlay on hardware and, moreover, does not allow reliable error detection with certain constellations. If an error is recognized, the components of the railroad automation system involved in the development of the error have to be isolated for reasons of operational reliability. If there are no longer enough functioning components available, the railroad automation system has to be reinitialized and this entails an interruption of the railroad operation. This often results in train delays, for example.

SUMMARY OF THE INVENTION

It is accordingly an object of the invention to provide a method for carrying out a technical process during normal operation and during repair operation which overcomes the above-mentioned and other disadvantages of the heretofore-known devices and methods of this general type and which eliminates the described problems in the prior art. In particular, the object is to disclose a method for performing a technical process with voting, which can continue to run for as long as possible even when errors are recognized.

With the above and other objects in view there is provided, in accordance with the invention, a method for performing a technical process, the method comprising:
 a) executing application programs redundantly in a plurality N of computing instances; and
 b) in a voting process based on an MooN (M-out-of-N) voting system, wherein M is at least two and N is at least three, comparing the plurality N of results of the redundant execution of the application programs;
 c) when a minority of the results is different from a majority of the results with identical content, excluding the minority of the results from being taken into account during a performance of the technical process;
 d) in a case according to step c), excluding the at least one affected computing instance responsible for generating the minority of the results from the performance of the technical process;
 e) in the case according to step c), generating, by a computing instance affected by the generation of the majority of the results, a state copy of a status to be reinitialized, and storing all messages sent to the computing instances from the generation of the state copy and a sequence thereof; and
 f) during a reinitialization, establishing a status of the affected computing instance according to the state copy and processing all stored messages in the stored sequence by the affected computing instance until the affected computing instance runs synchronously with the computing instances that are not affected by the reinitialization; and
 g) subsequently reintegrating the at least one affected computing instance into the performance of the technical process.

A first aspect of the invention describes a method for performing a technical process, in which:
 application programs are executed redundantly in a plurality N (N is a natural number) of independent computing instances (wherein, in order to execute the application programs, messages are received, processed and sent in a manner that is known per se; the latter if results of the execution of the application programs are to be transferred to other computing instances or to other hardware components involved in the technical process) and
 on the basis of an MooN system, wherein M (M is a natural number) is at least two and N is at least three, a comparison of the plurality N of results of the redundant execution of the application programs is performed in a voting, wherein
 in the event that a minority of the results differs from a majority of the results with identical content, the minority of results is not taken into account during the performance of the technical process.

In order to avoid any misunderstanding, it should be noted at this point that individual claim features are numbered consecutively with small Latin letters without taking the claim numbering into account. This means that each letter only appears once in the entire set of claims, which makes it possible to uniquely address the relevant claim features without mentioning the claim number. For this reason, however, the sequence of letters is of no significance.

To ensure that the application programs are executed redundantly, the computing instances work independently of one another. This means that the active processes for redundant execution of the relevant application program in the computing instances do not influence each other. Preferably, computing instances in each case access reserved memory areas of a memory unit or a plurality of memory units. Preferably, the computing instances that execute an application program redundantly do not exchange messages for the purpose of executing the relevant application program.

A comparator, also called a voter, is a facility for ascertaining the functionality of redundant systems. Majority decision systems, MooN systems for short, are assigned to active redundancy (majority redundancy). They are used as means for increasing the error tolerance of systems for which a level of operational reliability (safety) against failure or the occurrence of errors is required. There are various architectures of MooN systems. Practical applications in the context of the present invention can be found, for example, in triplex (2oo3) and quadruplex (3oo4) architectures. The results of MooN systems are compared by the majority decider (voter) in order to forward the result of the majority. The result is forwarded as long as at least M of the N systems are functioning (this applies, for example, to hardware components and machines) or M of the N results match when compared (this applies, for example, to data and measured values). Otherwise, the entire system is considered to have failed and an error can be output and/or a protective measure (for example, stopping the technical process) can be initiated.

Therefore, the voter makes a majority decision after the comparison. Herein, the following cases can occur.

All results are identical (in the context of the description of his invention, identical results are also referred to as a plurality of results in the sense that they were calculated by different computing instances. In other words, the mathematical understanding that the same result is only one result is not relevant here). This serves as evidence that the technical process is running error-free in all computing instances. This respective result can be used in each case in the computing instance involved in its creation for the further performance of the technical process or to generate messages to other computing instances.

The majority of the results is identical. This is considered to be evidence that the majority of these results is correct. This respective result (identical to other results) can be used in the computing instance involved in its creation for the further performance of the technical process or to generate messages to other computing instances, while computing instances that have calculated a divergent result are excluded from the performance of the technical process.

There is no majority of identical results. This means that either all results differ from one another or, compared to the number of results that differ from this result, the number of identical results does not form a majority. This is considered to be evidence that the risk of the presence of an error is too high. A protective measure is required for the performance of the technical process. This can, for example, consist in a warning message being issued or the performance of the technical process being aborted.

Exclusion from the set of redundant computing instances involved in the technical process (in short, contributing), whether individual or the entire team, (team means the entirety of the computing instances executing the relevant process steps redundantly) can be communicated by means of messages, including to the computing instances themselves. The computing instances switch themselves off (or in the event of the malfunction of the switch-off function, they are switched off remotely) if they are identified as errors by the voter and can then be restarted without errors according to the invention (more on this below).

A voter can be implemented using software or hardware, wherein a software-based voter is preferably used in the context of the present invention. A software-based voter consists of a program module for the comparison, also called voting, which processes the aforementioned results as input and generates an error or a release as output. In terms of hardware, a voter can also be implemented as an analog computer that performs voting by logically linking the modules of the analog computer. In particular, a program module can also run on a processor that is preferably not itself involved in the generation of the results. This results in a hardware separation of the tasks of generating the results on the one hand and evaluating the results by means of comparison on the other. This has the advantage that the method steps of generating the results and comparing the results can have less influence on one another, thus enabling the operational reliability of the comparison process to be further increased.

In accordance with the invention, in a case according to step c) (see above), the at least one computing instance affected by the generation of the minority of results is excluded from the performance of the technical process, and a state copy of a status to be reinitialized is created by a computing instance not affected by the reinitialization (i.e. by a computing instance affected by the generation of the majority of the results) and all messages sent to the computing instances from the creation of the state copy (in the form of data sets) and their sequence are stored, and during the reinitialization, the status of the affected computing instance is established according to the state copy and all stored messages are processed in the stored sequence by the affected computing instance until the affected computing instance runs synchronously again with the computing instances not affected by the reinitialization, and the at least one computing instance (previously affected by the generation of the minority of results) is then reintegrated into the technical process.

If the at least one affected computing instance is reintegrated into the technical process, this means that it again works synchronously with the computing instances that previously remained in the technical process. In other words, the reintegrated computing instance generates the required results in such close temporal proximity to the other computing instances that the results can all be compared again by the voter after integration into the process, as described above.

One advantage of the invention is that, in the context of the method according to the invention, computing instances that have been excluded from the technical process due to the voting, in other words, therefore, are in quarantine, can be "repaired" and reintegrated in the technical process after synchronization. This advantageously means that the technical process can continue to be operated on an ongoing basis even if errors occur repeatedly. The only condition is that a majority of the redundantly operating computing instances continue to run without errors, since this still ensures the operational reliability of the technical process.

The majority of the redundantly operating computing instances can also be used to compile said state copy. This ensures that this state copy is error-free and this is safeguarded by the matching results of the majority of the computing instances with a sufficiently high probability. After the transmission of the state copy to the quarantined computing instance, it can catch up on the "missed" computing steps using the stored messages until it is again running synchronously and then reintegrated into the technical process. Sufficient redundant computing instances are now again available in order to exclude the incorrectly calculating computing instance in the event of the next error. Otherwise, more and more computing instances would fail one after the other until the technical process came to a standstill. Hence, the invention contributes to increasing the stability of the technical process without compromising safety.

In a further aspect of the invention, a computer program product is described with program instructions for performing the method as outline above.

Hence, according to the invention, a computer program containing program modules with program instructions is described, wherein in each case the method according to the invention and/or the exemplary embodiments thereof can be executed by means of the computer program and the described advantages are achieved with the execution.

According to a further aspect of the invention, a provisioning apparatus for the computer program product is described, wherein the provisioning apparatus stores and/or provides the computer program product.

Moreover, therefore a provisioning apparatus for storing and/or providing the computer program in the form of a computer-readable storage medium is described. The provisioning apparatus is, for example, a memory unit that stores and/or provides the computer program. Alternatively or additionally, the provisioning apparatus is a network service, a computer system, a server system, in particular a distributed computer system, for example a cloud-based computer system or virtual computer system, which stores the computer program on a computer-readable storage medium and preferably provides it in the form of a data stream.

Provision takes place in the form of program data sets as a file, in particular as a download file, or as a data stream, in particular as a download data stream, of the computer program. The computer program is, for example, transferred to a computing environment using the provisioning apparatus, so that the method according to the invention can be executed in a computing instance of this computing environment.

An apparatus is computer-aided or computer-implemented if it has at least one computer or processor or a method is computer-aided or computer-implemented if at least one computer or processor executes at least one method step of the method.

A computing environment is an IT infrastructure consisting of components such as processors, memory units, programs and data to be processed with the programs, which are to be used to execute at least one application that has to perform a task. The IT infrastructure can also consist of a network of the afore-mentioned components.

A cloud (also referred to as a computer cloud or data cloud) is a computing environment for so-called cloud computing. This refers to an IT infrastructure that is made available via network interfaces such as the internet. It generally includes storage space, computing power or software as a service, without these having to be installed on a computing instance using the cloud. The services offered in the context of cloud computing comprise the entire spectrum of information technology and include, inter alia, the IT infrastructure, platforms, software and computing power, wherein the cloud provider distributes the resources offered to the cloud users as required, with the aim of making optimum use of resources.

Since high safety standards apply in railroad technology with regard to function (operational reliability, safety) and vulnerability (transmission reliability, security) of computer-implemented solutions, the functionalities of a cloud used in railroad technology are usually limited with regard to their shared availability. Therefore, restrictions are necessary in particular with regard to access by a potentially unlimited group of cloud users. However, access must also be limited with regard to the sharing of computing resources by different computing instances in order to ensure the necessary redundancy. In the context of the present invention, technology that takes these restrictions into account for railroad technology is also referred to as a private cloud, even if a private cloud only partially fulfils the technical features associated with cloud technology.

In any case, the features presented according to the invention fulfil the task of reliably providing distributed processing of application programs on distributed computing instances of commercial origin (so-called COTS components, the COTS acronym stands for "commercial off-the-shelf"). This advantageously reduces or even eliminates dependency on local circumstances and proprietary computer systems. Process stability can advantageously be guaranteed independently of the system.

Computing instances (or instances for short) form functional units within a computing environment which can be assigned to applications (provided, for example, by a number of program modules) and execute them. When executing the application, these functional units form physical (for example computer, processor) and/or virtual (for example program module) self-contained systems.

Computers are electronic devices with data processing capabilities. Computers can, for example, be clients, servers, handheld computers, communication devices and other electronic devices for data processing, which can have processors and memory units and can also be connected to a network via interfaces.

Processors can, for example, be converters, sensors for generating measuring signals or electronic circuits. A processor can be a central processing unit (CPU), a microprocessor, a microcontroller or a digital signal processor, possibly in combination with a memory unit for storing program instructions and data. A processor can also be understood as a virtualized processor or a soft CPU.

Memory units can be embodied as computer-readable memories in the form of a random-access memory (RAM) or data storage device (hard disk or data carrier).

Program modules are individual software functional units that enable a program sequence of method steps according to the invention. These software functional units can be implemented in a single computer program or in a plurality of computer programs that communicate with one another.

The interfaces realized here can be implemented as software within a single processor or as hardware if a plurality of processors is used.

Interfaces can be realized as hardware, for example wired or as a wireless connection, or as software, for example as an interaction between individual program modules of one or more computer programs.

Unless stated otherwise in the following description, the terms "create", "determine", "calculate", "generate", "configure", "modify" and the like preferably refer to processes which generate and/or change data and/or convert the data into other data. Herein, the data exists in particular in the form of physical quantities, for example as electrical pulses or analog electrical quantities. The necessary instructions are combined in a computer program as software. Furthermore, the terms "send", "receive", "read in", "read out", "transfer" and the like refer to the interaction of individual hardware components, in particular processors, and/or software components, in particular program modules via interfaces.

Various exemplary embodiments of the invention will now be described in the following, without limiting the basic concepts of the invention.

According to one variant, the aspects of the invention described above are determined by the fact that h) in the event that a majority of results with identical content cannot be determined in the voting step, the plurality N of results is not taken into account during the performance of the technical process;

i) in a case according to step h), the plurality N of computing instances is excluded from the performance of the technical process;

j) the plurality N of computing instances is reinitialized, wherein the redundant execution of application programs is restarted.

This variant of the invention describes the case in which all computing instances, or at least the majority of computing instances, in a team provide different results. In this case, it is not possible to create a state copy which can be assumed with sufficient certainty to be error-free. Instead, all computing instances in the team are reinitialized. Synchronization is therefore not possible because there are no computing instances that could continue to run during the reinitialization and form a reference for synchronization. Instead, after the reinitialization, which excludes the presence of errors in the application programs or in the processed data sets with the required certainty, the computing instances are made available to the technical process for processing new tasks in the form of the execution of application programs.

This variant of the invention has the advantage that the process can be continued even if an entire team of computing instances fails. This obviously requires the availability of a plurality of teams of computing instances that can ensure the process during the reinitialization of the affected team by processing the required application programs "by proxy" so to speak. During this time, the processing may at most be slowed down, but the process does not come to a complete standstill. In addition, sufficient computing capacity can be made available by the team so that the technical process is not slowed down if one team fails, but the computing instances do not run at full load if all teams are available. As a result, the performance of the process is improved with regard to running stability and availability.

According to one variant, the aspects of the invention explained above are determined by the fact that a) the state copy is only created by a computing instance not affected by the reinitialization as soon as the case according to step c) occurs.

The computing instance that is not affected by the reinitialization is a computing instance that is part of a majority of computing instances that deliver identical results. On the other hand, affected computing instances are always those that were excluded from participation in the technical process due to the generation of a divergent result (which represents a minority).

The use of state copies created by a computing instance not affected by the reinitialization has the advantage that they can be created as required. The requirement always only arises when a computing instance is excluded from the performance of the technical process due to a divergent result. As long as a majority of the computing instances deliver identical results, it can be assumed that these computing instances can create an error-free state copy. Since this only happens when required, and only then do the following messages and their sequence have to be saved, the required computing capacity is advantageously reduced to a minimum. As a result, this enhances the performance of the technical process in terms of computing capacity.

Alternatively, the state copy could be created cyclically by each computing instance. Each time a new state copy is created, the previous one, including the subsequently stored messages, is deleted. If a computing instance fails, a state copy already exists that can be used. This variant has the advantage that it is avoided that the computing instances influence one another by taking over a state copy from another computing instance. In addition, if a computing instance fails, the reinitialization can be started immediately without having to wait for a state copy to be created. As a result, this enhances the performance of the technical process in terms of the speed of the reinitialization.

According to one variant, the aspects of the invention explained above are determined by the fact that the content of the results of the majority of computing instances from at least one preceding comparison step, preferably at least 10 preceding comparison steps, are stored and, during processing of the messages according to step f), calculated results are compared with at least one of said stored results in at least one comparison step downstream of this processing for synchronization.

The comparison step for synchronization is preferably performed by the same voter as the comparison of the results according to step b) of the method according to the invention. Storing the results of the preceding comparison steps advantageously facilitates synchronization of the computing instances, both during normal operation in step b) and during the reintegration of a computing instance affected by an error in step f). A successful comparison by the voter is also possible if the results to be compared differ in time in the context of the stored results. In this connection, the following refers to a synchronization window in which synchronization is achieved even if the results to be compared are generated with a certain time offset. In the case of the reintegration of an affected computing instance, this can advantageously take place earlier, since it does not, so to speak, have to completely catch up with the not affected computing instances in order to be reintegrated.

The advantage of this variant is that the process runs more stably, since synchronization of the generation of the results by the application programs only has to be within the synchronization action window defined by the stored results.

As a result, an affected computing instance is reintegrated after a shorter synchronization time.

According to one variant, the aspects of the invention explained above are determined by the fact that the at least one computing instance (affected by the generation of the minority of results) is reintegrated into the technical process if a match between the respective stored result and the associated calculated result is determined in at least one downstream comparison step, preferably in at least three successive subsequent comparison steps, performed in the sequence of the stored results.

In the context of the present invention, downstream comparison steps are the comparison steps required for the reintegration of an affected computing instance according to step f). In terms of content, these do not differ from the comparison steps performed in the context of step b) of the method according to the invention. These are only downstream insofar as the reinitialization of the affected computing instance results in a time offset. This can then be made up by subsequently processing the work steps of the application programs installed on the affected computing instance that have already been processed by the affected computing instances that are not affected. For this purpose, starting from the state copy in the affected computing instance, the stored messages are processed in the stored sequence until the affected computing instance has reached the synchronization window again with regard to the results to be compared.

In order to ascertain successful synchronization, i.e., that the affected computing instance did not make any errors when subsequently processing the messages, it is necessary that there is at least one match with a stored result. However, it is also advantageous to wait until three successive results match before reintegration, which increases the certainty with regard to the statement that the affected computing instance is working synchronously without any errors. This advantageously enhances the performance of the system in terms of safety.

According to one variant, the aspects of the invention explained above are determined by the fact that the sequence of the messages is determined taking into account the time of sending of the messages, wherein the sequence corresponds to the chronological sequence of the sending.

In this case, the sequence of the messages describes a determinism that makes it possible to process interdependent work steps, i.e., work steps that are conditional on one another, with the same results (as the unaffected computing instances). This is necessary in order to send intermediate results from previous work steps as messages to subsequent work steps or to receive messages required for the processing of work steps.

Hence, this variant of the invention has the advantage that not only parallel work steps that run independently of one another on a computing instance, but also sequential work steps that have to be performed in a certain chronological sequence, can be reworked with step f) of the method according to the invention.

According to one variant, the aspects of the invention explained above are determined by the fact that the time of sending of the messages is saved as a digital time stamp.

If a digital time stamp is available for the time of sending of the messages, the sequence of the messages can be reliably determined at any time by analyzing the digital time stamp. In particular, it is advantageous if the digital time stamp forms part of the message so that it can be uniquely assigned to the relevant message. In addition, the time of sending can be ascertained at any time by reading the message so that a plurality of messages can be arranged in their chronological sequence.

According to one variant, the aspects of the invention explained above are determined by the fact that the state copy and the messages are sent and received by a message broker.

Message brokers advantageously take over the organization of the sending and receiving of messages relating to the relevant technical processes and also the above-explained processes of the reintegration of excluded computing instances.

According to one variant, the aspects of the invention explained above are determined by the fact that the message broker works with a publish/subscribe method. Therefore, a publish/subscribe system is used.

Herein, the publish/subscribe system comprises at least one sending-side facility configured to publish messages, at least one sending-side message broker, at least one receiving-side message broker and at least one receiving-side application for receiving messages.

Corresponding publish/subscribe systems are known as such from other fields of application and generally enable an information provider to be decoupled from an information receiver. Herein, sending-side applications (i.e., application programs running on computing instances) are often referred to as "publishers" and receiving-side applications as "subscribers".

The realization or use of a publish/subscribe system means that sending-side and receiving-side applications do not have to know one another. This in particular means that if a further receiving-side application wishes to receive messages or data from the sending-side application, the sending-side application does not have to be changed in order additionally to transfer the messages to the further receiving-side application.

For the method according to the invention, this means that computing instances that are excluded from the technical process can be easily replaced by other computing instances until they can be reintegrated into the method. Herein, the change of tasks of computing instances is ensured by corresponding subscription to the required messages. In the same way, reintegrated computing instances can update their subscription in order to receive the current messages again. The relevant older messages can also be retrieved in the required sequence for the synchronization process before reintegration.

According to one variant, the aspects of the invention explained above are determined by the fact that k) the messages are contained in application data sets containing data sections, l) the voting is performed with redundant data sections that have been changed identically several times as results (of the redundant execution of the application programs), m) in a case according to step c) in claim 1, the application data sets containing data sections causative for error identification (i.e., form a minority of results that diverges from the majority of the results) are not taken into account during the performance of the technical process.

It is advantageous to save the messages in individual data sections of application data sets. This makes it possible to specifically address, for example, the work results of the redundant application of an application program in order to subject them to a comparison in a voter in the above-described manner. However, other data sections in the application data sets can also advantageously be subjected to comparison, since these likewise provide information on the reliable functioning of the technical process (more on this below).

According to one variant, the aspects of the invention explained above are determined by the fact that a memory unit of the computing instances is operated in such a way that n) application data sets are filed in the memory unit and are coded before being filed, o) application data sets are retrieved from the memory and decoded after retrieval, wherein the memory unit is monitored for errors by performing a chronological sequence of computer-aided test runs for the memory unit, and wherein the reinitialization of the affected computing instance according to step f) in claim 1 is only started when at least one, preferably two, successive test runs reveal that no errors are present.

Completing a test run is the minimum requirement for ensuring that each application data set has been tested at least once before the reinitialization of the affected computing instance is started. It is even safer to wait for two successive test runs because it must be assumed that a test run is in progress at the time a computing instance fails. As the determination of which application data sets have already been tested at this stage is susceptible to errors and therefore it would be necessary to test in the next test run before it can be determined that all application data sets are free of errors, it is easier to wait for the positive result of this test run and then perform a further complete test run. If this likewise produces a positive result, it is certain that each application data set has been tested at least once (sometimes twice) without having to test in detail which application data set had not yet been tested in the preceding test run at the time of failure of the computing instance.

In general, the method for operating the memory unit and for executing application programs can be used to determine which data sets are actually, or at least potentially, corrupt and therefore endanger operational reliability when checking the data section containing data when executing the application programs, in particular the utility programs, by testing the data section containing data for the application programs and the test data section containing further criteria that facilitate checking, in particular. The affected data sets are identified by the output of an error and preferably excluded from further data processing.

In other words, in this variant, operational reliability is, so to speak, linked to the data sets themselves. For this purpose, these are provided with suitable test data sections according to the invention. This advantageously enables the data sets to be filed on one and the same memory unit, even if processes run in parallel (redundantly) for reasons of operational reliability. In particular, this enables commercially available software and hardware components, so-called COTS components, to be used to store the data sets and run the application programs without compromising requirements for operational reliability. Such components can therefore, for example, also be used in railroad technology applications and replace proprietary systems. COTS components are advantageously inexpensive to purchase and can also be replaced more easily and integrated into cloud solutions.

According to one variant, the aspects of the invention explained above are determined in that, in the event that an error is found in one of the test runs, the method is performed starting from step e), and irrespective of the occurrence of case c).

It is advantageous if the errors in the application data sets are also corrected as soon as they are noticed. This is because they can potentially also lead to errors when processing the application data sets (in particular those of the application programs), which represents a safety risk for the operation of the technical process. However, the process of reinitialization also affects the stored application data sets that are copied from an intact (unaffected) computing instance when the state copy is created.

According to one variant, the aspects of the invention explained above are determined in that, for the initial coding (COD) of the data, p) at least one application data set (ADS) containing data sections with application data for at least one of the application programs and test data sections (PA) is generated or selected, q) for each application data set (ADS), the test data section (PA) is occupied by count data (ZD) that identifies the test run being performed, r) each application data set (ADS) is coded and filed, and that, in order to test the data in the test run being performed after retrieving and decoding (DEC) the application data sets (ADS) in each case, s) an error is determined for an application data set (ADS), if the count data (ZD) does not identify either the test run being performed or the most recent test run that has been completed, t) the test data section (PA) of the relevant application data section is occupied by count data (ZD) that identifies the test run being performed if no error was determined, u) the relevant application data set (ADS) is coded and filed again if no error was determined.

The fact that a test data section (which was previously generated if there was no test data section, or selected if a test data section was already available for the relevant data section) is assigned to each of the data sections during the initial coding means that count data can be saved in the relevant data set which contains information about the test run being executed. The subsequent coding of the relevant data set protects the count data and also the other data of the relevant data section from access until it is decoded. Namely, in the coded state, the data cannot be changed accidently (for example due to a malfunction) or deliberately (for example due to an external attack) without a change being recognized as an error when the data is decoded. At the very least, it is extremely improbable that the change will not be noticed as an error when the data set is decoded. In this respect, there is no protection against changes per se, but only against undetected changes. Cyclic testing of the memory content for correct coding (using the count data) means that so-called dormant errors are also detected. This refers to errors that can occur during data storage, for example due to physical changes to the storage medium (bit flips, etc.). According to this variant, the low probability of not detecting errors makes it possible to comply with higher safety levels (SIL-1 . . . . SIL-4).

Preferably all data required by the application program is protected in the data set, i.e., both the data that makes up the program per se and the data that represents the information to be processed.

For example, it is possible that memory errors, i.e., errors that occur while the data is being stored on a memory (for example, so-called bit flips), or processing errors, i.e., errors that occur while the data set is being processed, cause the count data to be changed. However, then such a change is determined during the next test run if the count data does not identify either the test run being performed or the most recently completed test run. In such a case, an error is determined. Even if the cause of the error cannot be uniquely determined and it might possibly be harmless for data processing, for reasons of the level of safety to be achieved, when the error is determined, it is, for example, output and/or measures are taken to prevent further processing of the erroneous data.

The errors are also detected during voting so that the affected computing instance is excluded according to the above-described method. This is followed by the process of reinitialization in which, in the variant described, a test run or even two successive test runs are awaited before initialization. As a result, advantageously, memory errors that have occurred are also reliably corrected. Redundantly stored data sets of other computing instances are available for this purpose.

Whenever no error is determined in a test run, the count data in the test data section is occupied by the count data of the test run being performed, the data set is coded and filed again. As a result, the relevant data set is simultaneously identified as having been tested in the relevant test run.

Count data must have the property that it forms a series in which in each case the predecessor and the successor of each element of the set of count data is known. In principle, all mathematical series can be used here. Particularly preferably, the set of natural numbers can be selected.

The test run is preferably performed using an application program (service program), which performs the test run. For this purpose, the relevant application program, which can also be referred to as a test program, accesses the memory unit, decodes, tests and codes data set-by-data set, until a test run has been completed. In the event of an error being determined, this can be output by the test program. Herein, the test program can also contain functions containing a response to an error determined, for example, suspending the performance of an application program (utility program) on the affected computing instance, which uses the erroneous data sections of the application (also called application data sections) and therefore could make potentially safety-relevant errors. This advantageously enables additional error sources to be detected, even if they are not directly related to the redundant processing of data itself.

The performance of the test run can, for example, be controlled by addressing the individual data sets. If the addresses of all data sets are known at the start of the test run, the data sets can be retrieved sequentially until the test run is complete (more on this below).

If a test run as a whole is performed incorrectly, in the sense that it does not test all data sets in a test run, this will be noticed at the latest during the next test run, at least provided that the non-tested data sets are tested again in the following test run. These then still contain the count data of the last but one test run, which is noticed during the following test run. As a result, an error is recognized and output. Therefore, the count data also enables monitoring of the correct performance of the test runs themselves. This enables a further cause of the error to be recognized. Data that is classified as outdated, and thus potentially erroneous, (because it is not checked regularly in a test run), is not sufficiently safe with regard to its integrity, which is why this is considered to be an error.

This creates an additional safety mechanism that enhances the operation of the memory unit and the execution of application programs (these are service programs or utility programs; more on this below). This enhancement is of particular benefit to particular safety-relevant applications, for example railroad applications, that have to meet certain safety levels (also called SIL-1 SIL-4 or safety integrity levels). In the context of the present invention, the term "safety" should, as mentioned, be understood in the sense of operational reliability (safety). In particular, coding is carried out primarily according to the viewpoints of operational reliability and not according to the viewpoints of transmission reliability (security). In this variant of the invention, therefore, preferably, a coding method is provided which achieves high performance in coding and decoding (resulting in short coding and decoding times) and does not guarantee a high degree of difficulty in decoding a coding without authorization.

In addition, a further aspect of the invention describes a computer program containing program modules with program instructions for performing said method according to the invention and/or the exemplary embodiments thereof, wherein in each case the method according to the invention and/or the exemplary embodiments thereof can be performed by means of the computer program.

Moreover, a further aspect of the invention describes a provisioning apparatus for storing and/or providing the computer program. The provisioning apparatus is for example a memory unit that stores and/or provides the computer program. Alternatively and/or additionally, the provisioning apparatus is, for example, a network service, a computer system, a server system, in particular a distributed computer system, for example a cloud-based computer system and/or virtual computer system, which the computer program stores and/or provides, preferably in the form of a data stream.

Provision takes place in the form of a program data set as a file, in particular as a download file, or as a data stream, in particular as a download data stream, of the computer program. This provision can, for example, also take place as a partial download consisting of a plurality of parts. Such a computer program is, for example transferred to a computing environment using the provisioning apparatus so that the method according to the invention can be executed in a computing instance.

Identical or corresponding elements of the drawing in the individual figures are in each case given the same reference characters and are only explained more than once if there are differences between the individual figures.

The exemplary embodiments explained below are preferred embodiments of the invention. In the exemplary embodiments, the described components of the embodiments in each case represent individual variants of the invention that are to be considered independently of one another and which develop the invention independently of one another and should thus also be regarded as part of the invention individually or in a combination other than that shown. In addition, the components described can also be combined with the above-described variants of the invention.

The construction and method of operation of the invention, however, together with additional objects and advantages thereof will be best understood from the following description of specific embodiments when read in connection with the accompanying drawings.

Independent of the grammatical term usage, individuals with male, female or other gender identities are included within the term.

DETAILED DESCRIPTION OF THE INVENTION

Figure 1:
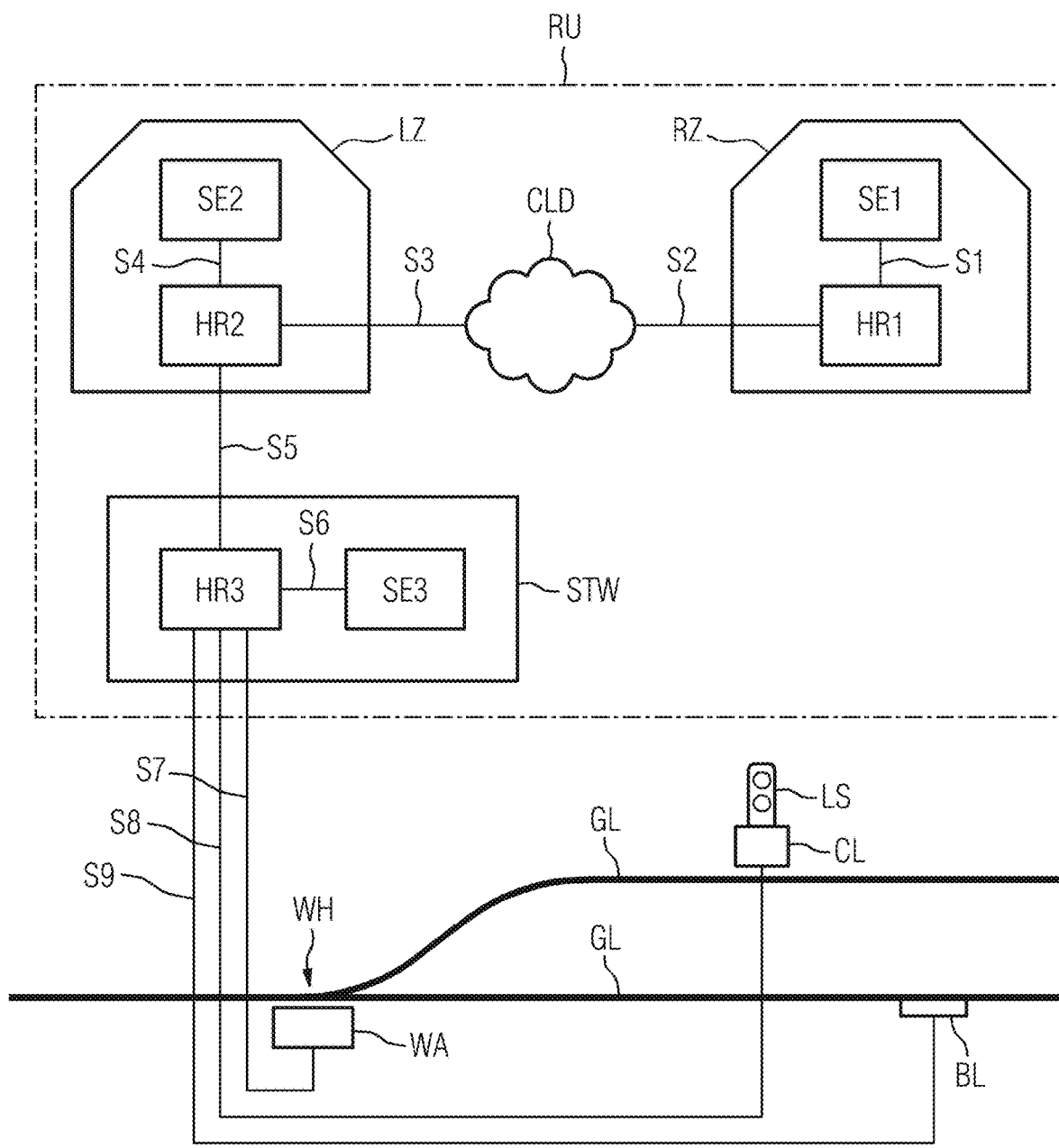
FIG. 1 schematically shows a railroad application with a computing environment with its interactions, wherein an exemplary embodiment of the method according to the invention can be executed with the computing environment.

Referring now to the figures of the drawing in detail and first, in particular, to FIG. 1 thereof, there is shown a schematic depiction of a railroad application that is controlled by a computing environment RU. The railroad application has tracks GL on which various components of the signal box technology STW are depicted by way of example. This is a switch drive WA which can set a switch WH. Furthermore, a balise BL is installed in one of the tracks GL which can be used to exchange information with the trains passing over the balise BL. Finally, a light signal LS is shown which is controlled by a controller CL.

The computer environment RU can have various host computers, namely a first host computer HR1, a second host computer HR2 and a third host computer HR3, on which the applications for controlling the railroad application are distributed in the form of application programs AP1 . . . . AP5 (more on this below). The first host computer HR1 is provided by a computer center RZ and is connected to a first memory unit SE1 via a first interface S1. The computer center RZ can, for example, be operated by a service provider of the railroad operator or by the railroad operator itself. The first host computer HR1 is connected to a private cloud CLD via a second interface S2 so that it is not locally bound to the railroad application. The cloud CLD can be a private cloud CLD, wherein this should be understood to be a cloud CLD for which access is restricted to authorized users.

A control center LZ of the railroad operator houses the second host computer HR2 that is likewise connected to the cloud CLD via a third interface S3. In addition, the second host computer HR2 is connected to a second memory unit SE2 via a fourth interface S4.

The computer environment RU also has by way of example a signal box STW which houses the third host computer HR3 which is connected to a third memory unit SE3 via a sixth interface S6. In addition, the third host computer HR3 has a fifth interface S5 to the second host computer HR2. In a manner not depicted, the third host computer HR3 could also be connected to the cloud CLD. The third host computer HR3 also has a seventh interface S7 to the switch drive WA, an eighth interface S8 to the controller CL and a ninth interface S9 to the balise BL.

All interfaces S1 . . . . S9 according to FIG. 1 can in principle be realized using wired connections or wireless transmission technology, for example radio. The arrangement of the host computers HR1 . . . . HR3 merely an example and can be expanded as required for more complex railroad systems. A computing environment is defined by the fact that the participating host computers HR1 . . . . HR3 can communicate with one another and thus the applications can be processed in a distributed manner on the host computers HR1 . . . . HR3 taking into account the available computing capacities. For this purpose, computing instances not depicted in further detail are formed; these are described in more detail below (see FIG. 2 where the computing instances RP1 . . . . RPn are depicted).

Figure 2B:
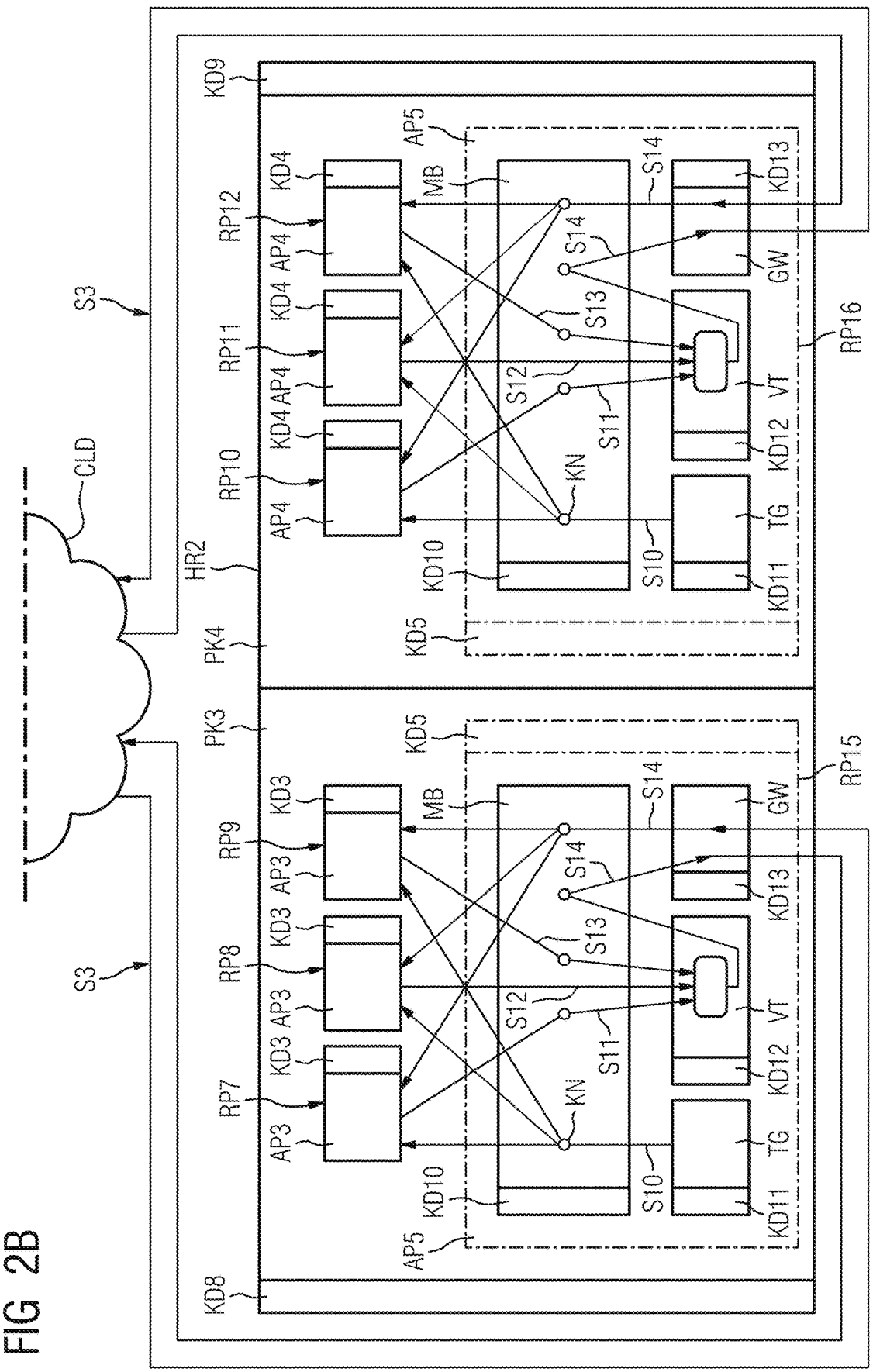
FIG. 2, which consists of the partial FIGS. 2A and 2B, respectively illustrated on two separate sheets, is a block diagram showing an exemplary embodiment of the method according to the invention with reference to a computing environment in the railroad application according to FIG. 1 with two host computers, wherein the individual functional units contain program modules which result in application programs and can in each case run in one or more processors and can accordingly be implemented in software or hardware.

FIG. 2 depicts the configuration of the first host computer HR1 and the second host computer HR2 according to FIG. 1 by way of example. Further host computers can be integrated in a similar way. The host computers are organized such that, for implementation, certain task packages are organized on the host computers in the form of program packages PK1 . . . . PK4 which consist of individual application programs AP1 . . . . AP5. A first application program AP1, a second application program AP2, a third application program AP3 and a fourth application program AP4 are provided for processing railroad applications as depicted in FIG. 1 and are hence utility programs.

Program packages PK1 . . . . PK4 generally combine a number of application programs AP1 . . . . AP5, the joint processing of which can be combined with regard to the entirety of applications. In particular, it can be provided that all application programs AP1 . . . . AP5 contained in a data set are combined to form a program package. Herein, account is taken of the fact that the data set combines data sections DA with regard to the data to be used, while in parallel a program package combines the corresponding application programs AP1 . . . . AP5 to which the data sections DA are assigned.

Configuration data KD1 . . . . KD13 should be understood as data that configures application programs AP1 . . . . AP5 for the individual requirements of the present application. The configuration defines the interaction between different application programs AP1 . . . . AP5 and the function of the application programs AP1 . . . . AP5 on the hardware components on which they are installed. In addition, the configuration contains adaptations to the present application for which the relevant application program is intended (for example parameters that may differ in different applications).

A fifth application program AP5 also shows that this can be realized by individual subprograms TG, VT, GW, MB. The subprograms TG, VT, GW, MB of the fifth application program AP5 are a gateway GW, a voter VT, a clock generator TG and a message broker MB (more on this below). However, this is only to be understood as an example of how the voter VT to be used according to the invention can be realized in terms of software and integrated into a functional environment. Alternatively, for example, the clock generator TG could run in another (non-secure) application while the remaining subprograms TG, VT, GW, MB run as described in the (secure) fifth application program AP5.

In the sense of the invention, subprograms TG, VT, GW, MB should generally be understood to be smaller units such as program modules, the totality of which result in the application program. Hence, it is advantageously possible to construct application programs AP1 .... AP5 in a modular manner, i.e., for example to provide program modules that are used in a plurality of application programs AP1 .... AP5. Herein, the subprograms TG, VT, GW, MB can be configured with different configuration data KD1 .... KD13 depending on their use. Hence, subprograms TG, VT, GW, MB make it possible to create application programs AP1 .... AP5 more easily and thus to adapt the computing environment more easily to an application.

In connection with the creation of program packages PK1 .... PK4, application programs AP1 .... AP5 and subprograms TG, VT, GW, MB, it should be noted that in each case configuration data KD1 .... KD13 can be assigned to the program packages PK1 .... PK4, the application programs AP1 .... AP5 and the subprograms TG, VT, GW, MB. This can result in certain data with the same content being saved multiple times, wherein this data in each case results in data sections DA which can in turn be uniquely assigned to a program package, application programs AP1 .... AP5 or subprograms TG, VT, GW, MB. The possibility of unique assignment is important here in order to have uniquely addressable data sections DA available for the implementation of test functions, in particular the memory units (see the diversity characteristic data DD1 .... DD4 described below).

The fifth application program AP5 is organized in the same way in all program packages PK1 .... PK4. Messages can be exchanged with the private cloud CLD via the gateway GW. Therefore, the gateway GW forms the second interface S2 and the third interface according to FIG. 1. The messages are distributed within the program package via the message broker MB, preferably according to the publish/subscribe method. The gateway GW uses, for example, a fifteenth interface S15 to make received messages available to redundant computing instances RP1 .... RPn via the message broker MB. These are then retrieved by the redundant computing instances RP1 .... RPn. This is indicated by nodes KN which are indicated in the fifteenth interface S15 (and likewise in the further interfaces S10 .... S14 described below).

In FIG. 2, for the sake of clarity, the program packages PK1 .... PK4 are in each case completely realized in a host computer HR1 .... HR2. In reality, program packages PK1 .... PK4 with their application programs AP1 .... AP5 and their subprograms TG, VT, GW, MB can also run in a distributed manner across a plurality of host computers (not depicted). This advantageously makes it possible to use the capacities of host computers if they do not provide sufficient capacity for the configuration of an entire program package by sharing the capacity of a plurality of host computers for the relevant program package.

The program packages PK1 .... PK4 can, for example, be provided for a certain task package. For example, a program package can be used to actuate a certain railroad component (light signal LS, signal box STW, switch WH, balise BL, axle counter, etc.). Generally, a plurality of application programs AP1 .... AP5 is required for the actuation of this railroad component. In particular, the fifth application program AP5 already explained above is also required to ensure safe execution of the application and communication with other program packages PK1 .... PK4 or host computers. This is referred to as a service program, which serves to safeguard the function of the host computer and thus executes an application relating to the host computer (in contrast to application programs AP1 ... AP5, which process user data for railroad components and are hence referred to as utility programs). The fifth application program AP5 likewise runs in at least one computing instance RP9 .... RP12 per host computer, but preferably not redundantly.

In the sense of the invention, a plurality of redundant computing instances is understood to be a software implementation on the host computers HR1 .... HR3, which permit parallel, i.e., simultaneous, processing of application programs AP1 .... AP5, preferably within the respective program package. FIG. 2 depicts program packages PK1 .... PK4 each with three redundant computing instances (for example RP1, RP2 and RP3), to form a redundant 2oo3 system, but more redundant computing instances RP1 .... RPn are also conceivable, as depicted by way of example for the first program package PK1. The following explains the method for processing application programs AP1 .... AP5 using the first of the program packages PK1 .... PK4 for the first redundant computing instance RP1, the second redundant computing instance RP2 ... and the third redundant computing instance RP3 for processing the first application program AP1. However, the program packages PK1 .... PK4 are processed accordingly, so that this does not need to be explained separately.

In the first redundant computing instance RP1 to the third redundant computing instance RP3, the first application program AP1 is processed redundantly, i.e., simultaneously in parallel. This is an application program that takes over a task for the railroad application according to FIG. 1. Moreover, from the first redundant computing instance RP1 to the third redundant computing instance RP2, first configuration data KD1 is available—this is required to execute the first application program AP1 for processing the individual task of the railroad application. For example, the first application program AP1 can generally be used to actuate light signals LS, wherein the first configuration data KD1 ensures the application of the first application program AP1 to the light signal LS according to FIG. 1. Here, for example, communication with the controller CL according to FIG. 1 must be ensured.

Configuration data KD1 .... KD13 is also available for all other program packages PK1 .... PK4, application programs AP1 .... AP5 and subprograms TG, VT, GW, MB. Accordingly, the configuration data KD1 .... KD13 contains the data required in each case for the program packages PK1 .... PK4, application programs AP1 .... AP5 and subprograms TG, VT, GW, so that they can take over the tasks assigned to them in the relevant application. Herein, the configuration data KD1 .... KD13 is in each case unchangeable and can therefore be saved in a data section DA with a known start and a known end. Likewise, all program packages PK1 .... PK4, application programs AP1 .... AP5 and subprograms TG, VT, GW, MB are saved as data sections DA with a known start and a known end. For example, the first memory unit SE1, the second memory unit SE2 and the third memory unit SE3 according to FIG. 1 are available for this purpose. However, data that is filed in one of said memory units or remains stored in one of said memory units for a certain period of time is subjected to regular test runs, which can be used to recognize memory errors in the saved data (more on this below). Memory errors are understood to be errors that occur or arise in the data when the data is filed or retrieved while the data is stored in the memory unit.

Data that changes during the processing of programs is exchanged between the participating partners as messages. As already mentioned, the message broker MB is available for this purpose. In addition, the individual host computers HR1, HR2 communicate via the external interfaces S2, S3, for example by means of the private cloud CLD, so that data can also be exchanged between different program packages PK1 .... PK4 of different host computers. Once the data has been changed, it is filed again in the first memory unit SE1, the second memory unit SE2 or the third memory unit SE3. Errors can also occur during the processing of the data; these errors are referred to more precisely as processing errors in the context of the present invention.

The processes in the railroad application according to FIG. 1 are safety-relevant for the operational reliability of the railroad application. This is the reason why the first application program AP1 is processed parallel in time, i.e., redundantly, in the first redundant computing instance RP1 to the third redundant computing instance RP3. The first redundant computing instance RP1, the second redundant computing instance RP2 and the third computing instance RP3 send the result of the processing of the first application program AP1 to the message broker MB, and namely the first redundant computing instance RP1 via an eleventh interface S11 and the second redundant computing instance via a twelfth interface S12 and the third redundant computing instance via a thirteenth interface S13. These results are retrieved via said interfaces by the voter VT, who performs voting VTG. Only if the majority of the results match (i.e., in the case of three redundant computing instances in the 2oo3 system, at least two results, in the case of four redundant computing instances, at least three results, ... in the case of n redundant computing instances, at least n/2+1 for an even n and n/2+0.5 for an odd n), the result is made available to the message broker MB via a fourteenth interface S14 and can be retrieved by the gateway GW via the fourteenth interface S14 for transmission to other units via the second interface S2.

To ensure that the calculation results for the voting VTG are made available simultaneously by the voter VT, the processes in the first redundant computing instance RP1 and in the second redundant computing instance RP2 and the third redundant computing instance RP3 are clocked via the clock generator TG. This provides clock signals via a tenth interface S10, which can likewise be retrieved from the first redundant computing instance RP1 and the second redundant computing instance RP2 via the message broker MB.

The described type of task processing by the first application program AP1 is ensured by the fifth application program AP5. The fifth application program AP5 is therefore an internal application program that supports the functionality of the host computers HR1 .... HR3 and is hence a service program. This makes it clear that application programs AP1 .... AP5 must be made available not only for the application of the railroad application according to FIG. 1 (utility programs), but also for the processing of applications for the host computers HR1 .... HR3 (service programs).

Here, the combination of application programs AP1 .... AP5 to form program packages PK1 .... PK4 and the subdivision of application programs AP1 .... AP5 into subprograms TG, VT, GW, MB facilitates the compilation of application programs AP1 .... AP5 and the testing of the processing of the tasks for freedom from errors. For this purpose, data is combined to form data sections DA which can in each case can be uniquely identified and addressed (by defining a start of the data section DA and an end of the data section DA). As already mentioned, subprograms TG, VT, GW, MB, application programs AP1 .... AP5, program packages PK1 .... PK4 and the associated configuration data KD1 KD13 in each case are filed in data sections DA (wherein these usually consist of a plurality of data sections DA).

Advantageously, in addition to the redundancy in processing already described, redundancy in data storage can also be provided. Here, the required data is preferably saved multiple times using so-called diversity characteristic data DD1 .... DD4 to identify the redundant storage in each case, so that the data sections DA and configuration files can in each case be uniquely assigned. In other words, in this case, if different application programs AP1 .... AP5 use the same configuration data KD1 .... KD13, they do not access the same storage location for this data, but in each case always access the data section DA assigned to them in which the data is available. As already described, moreover, the data is preferably also stored in coded form.

Figure 3:
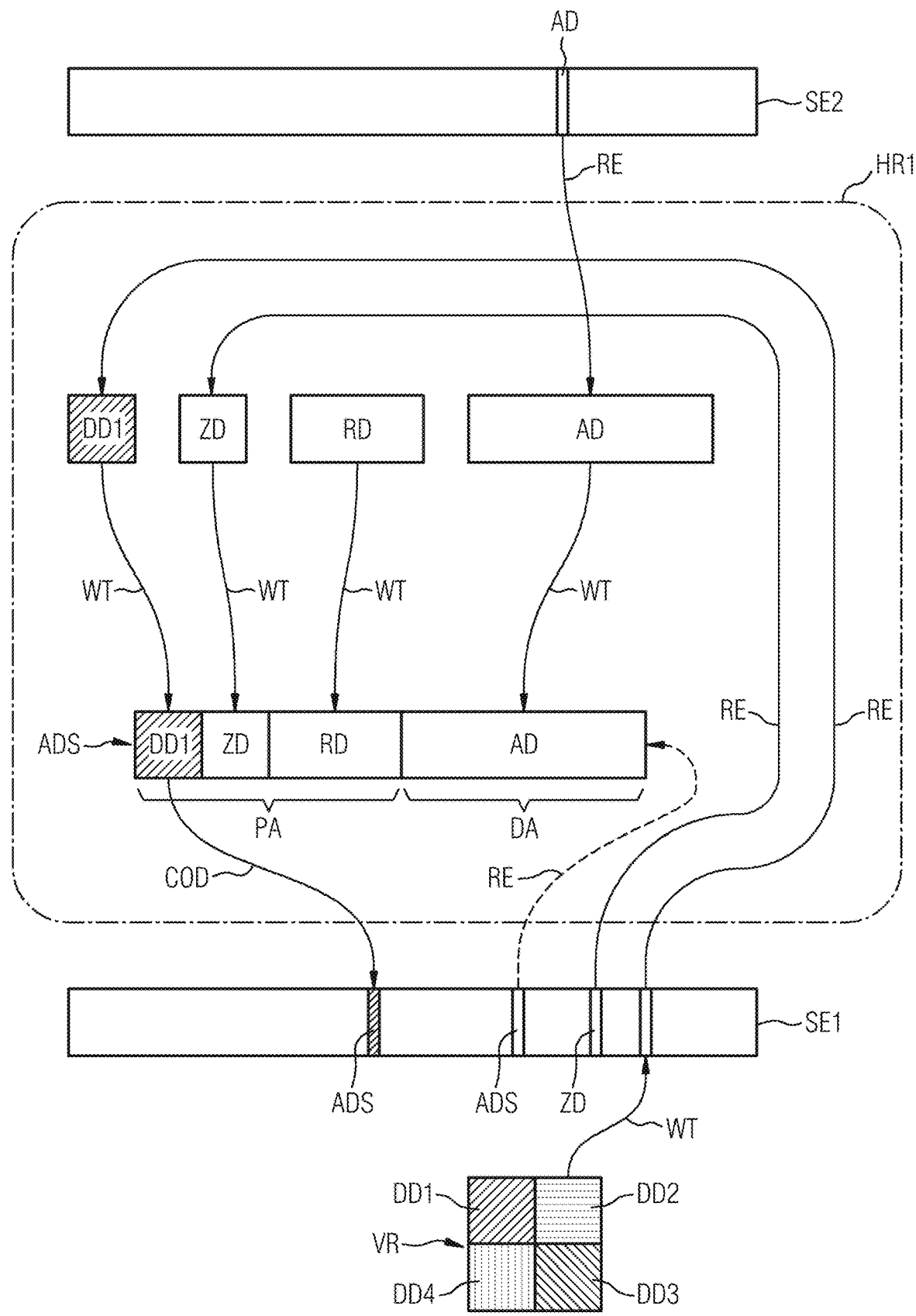
FIGS. 3 and 4 show exemplary embodiments of the method according to the invention as a flow chart, wherein the individual method steps can be implemented individually or in groups by program modules and wherein the functional units and interfaces according to FIG. 2 are indicated by way of example.

FIG. 3 is a schematic depiction of the method step of initial coding of data during the performance of the technical process. Here, in the technical process, new data is repeatedly generated (work results) which in each case should be before saving. This is depicted for a computing environment, for example consisting of the first host computer HR1, the first memory unit SE1 and the second memory units SE2. In principle, the first host computer HR1 can access data that is saved in the first memory unit SE1 and in the second memory unit SE2. Herein, this can involve reading (RE) and writing (WT), as indicated by corresponding arrows.

The memory units SE1, SE2 can, for example, store application data AD for applications AP1 .... AP5 (see FIG. 2) for the performance of application programs AP1 .... AP5. Furthermore, it is possible to store count data ZD and a pool VR of diversity characteristic data DD1 .... DD4 (i.e., first diversity characteristic data DD1, second diversity characteristic data DD2, third diversity characteristic data DD3 and fourth diversity characteristic data DD4). In order to use the application data AD for applications in the sense of the invention, i.e., a method for the computer-aided execution of an application program for performing the technical process in the manner according to the invention, the application data AD must be saved in the form of application data sets ADS, which are created by means of the method according to FIG. 3 and filed in coded form after a coding process COD.

FIG. 3 depicts, purely by way of example, how the application data AD, the count data ZD and the diversity characteristic data DD1 .... DD4 occupy individual memory areas of the first memory unit SE1 and the second memory unit SE2. In principle, it is arbitrary where the corresponding data is filed; it is found by suitable addressing and there are no restrictions as to which application data set ADS is saved where in the memory units SE1, SE2.

Furthermore, the diversity of the diversity characteristic data DD1 .... DD4 is indicated by hatching, which should make it clear that application data sets ADS can be identified by the diversity characteristic data DD1 .... DD4 from the pool VR. As shown in the pool VR, longitudinal hatching, transverse hatching and two diagonal hatchings are available at an angle of 90° to one another. The application data set ADS shown in detail in FIG. 3 has, for example, hatching that indicates the first diversity characteristic data DD1.

As the enlarged application data set ADS shows, this consists of a data section DA for the application data AD and a test data section PA that has first diversity characteristic data DD1, a counting element in the count data ZD and redundancy data RD. The first diversity characteristic data DD1, the count data ZD, the redundancy data RD, which is filled with a start value, and the application data AD are combined in the first host computer HR1, for example in a write process WT in a random-access memory (not depicted) to form the application data set ADS and stored in this way. The application data set ADS is then coded in a coding process COD and transferred to the first memory unit SE1, wherein, due to the first diversity characteristic data DD1, the diversity is also indicated in the first memory unit SE1 by said hatching. The application data set ADS is available there for further retrieval (see FIG. 4).

Figure 4:
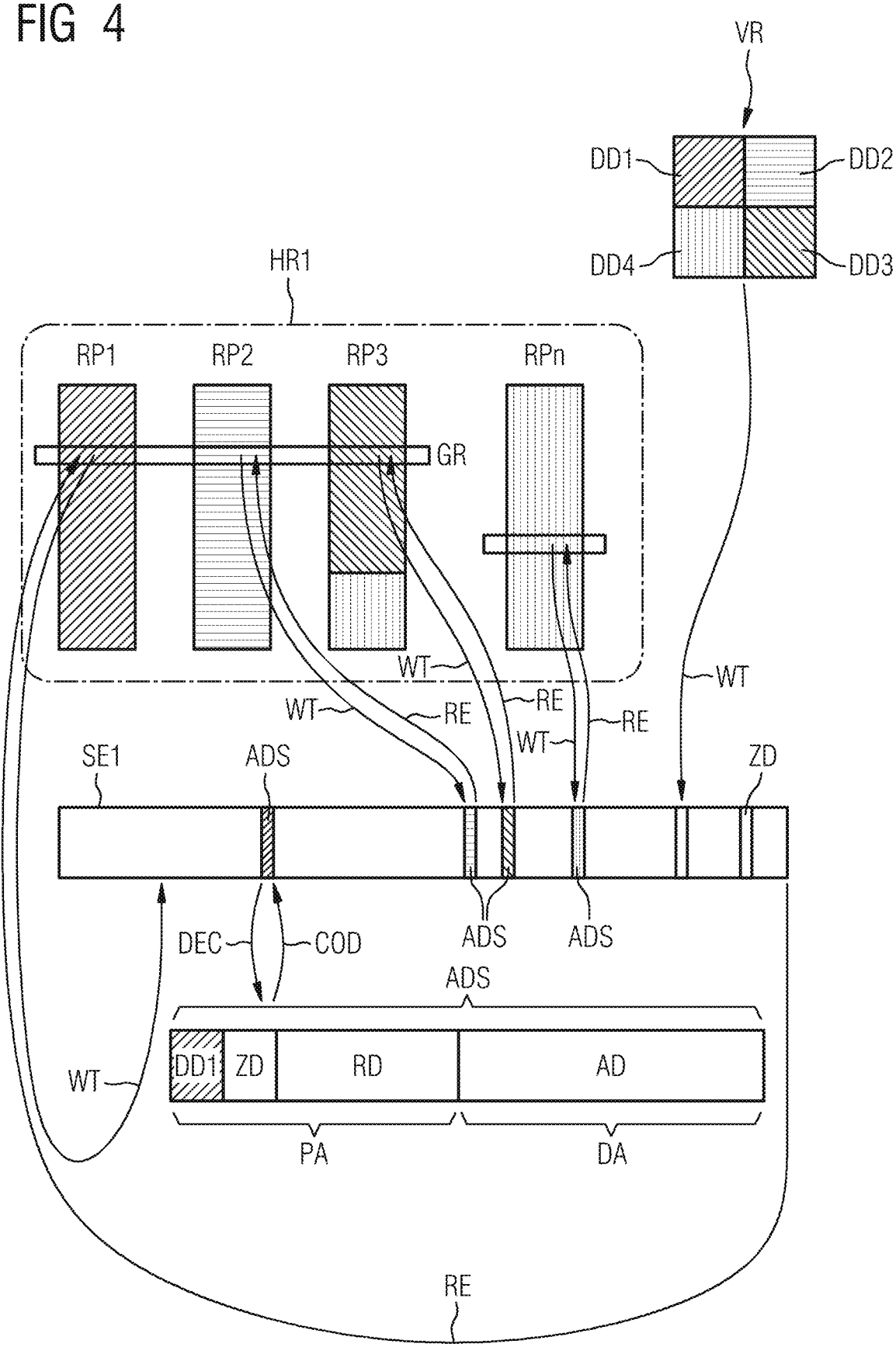

FIG. 4 is a schematic depiction of the use of the application data set ADS according to FIG. 3 and further application data sets ADS with the second diversity characteristic data DD2 and the third diversity characteristic data DD3. The three application data sets ADS depicted should contain identical application data AD in order to enable parallel processing according to the invention in a group GR of computing instances RP1, RP2, RP3 with subsequent voting VTG (these form a 2oo3 system). In each case, the test data section PA is occupied by the different diversity characteristic data DD1 . . . . DD4. The count data ZD and the redundancy data RD can also diverge from one another.

The application data sets ADS are executed in the three computing instances RP1, RP2, RP3. For this purpose, the application data sets ADS are in each case read into the computing instance in a read process RE. Herein, the computing instances RP1, RP2, RP3 are in each case assigned a certain diversity—this is represented accordingly by hatching. This hatching corresponds in each case to that of the diversity characteristic data DD1 . . . . DD4 of the pool VR.

It should also be recognized that a computing instance RPn can also process data from two diversities, in the present case the application data sets ADS identified with the third diversity characteristic data DD3 and the fourth diversity characteristic data DD4. This enables optimum utilization of the computing capacity provided by the computing instance RPN.

The computing instances RP1, RP2, RP3 in each case read the application data sets ADS of the correct diversity. This is achieved by service programs that run in the background so that the computing instances RP1, RP2, RP3 automatically address the correct application data sets ADS. This is depicted in more detail for the application data set ADS according to FIG. 3 with the first diversity characteristic data DD1 and will be explained more precisely below.

If this application data set ADS is retrieved, it is first decoded in a decoding process DEC and then read (RE). Decoding enables the first diversity characteristic data DD1, the current count data ZD and the redundancy data RD to be read together with the application data AD and service programs to be used which recognize any memory errors that may have occurred. It is possible to test whether the first diversity characteristic data DD1 originates from the pool VR and/or matches the diversity of the first computing instance RP1. The count data ZD can be used to check that test runs are running properly since it must identify the test run in progress or the previous test run. Only if the test reveals that the data has no memory errors is it released for reading (RE) processes by the first computing instance RP1. This applies both for the parallel processing of the application data set ADS by application programs AP1 . . . . AP5 in the computing instances RP1, RP2, RP3 (regular operation of a 2oo3 system) depicted in FIG. 4 and for the reinitialization of the computing instance RPn (repair operation) which is performed in parallel to the regular operation (more on this below).

After processing the application data set ADS, the first computing instance RP1 writes it back to the first memory unit SE1. Here, it is again possible to check the test data section PA, the first diversity characteristic data DD1, the count data ZD and the redundancy data RD in order to identify any processing errors when processing the application data set ADS (wherein a detected error leads to the exclusion of the affected computing instance and its reinitialization and the remaining computing instances form a 2oo2—two-out-of-two voting—system). In addition, the count data ZD is equated with the counting element which identifies the active test run. The application data set ADS is then coded (COD) and written (WT) to the first memory unit SE1.

Although not depicted in detail, this method is likewise performed for the further application data sets ADS in the computing instances RP2, RP3 (regular operation) and also by the computing instance RPn (repair operation) during subsequent processing of the messages stored in the form of application data sets ADS in the stored sequence. After successful processing of the application data sets ADS, voting VTG is additionally performed for the application data sets ADS in order to determine that the application data sets ADS have been changed identically by the processing by the computing instances RP1, RP2, RP3. If this is not the case, this indicates a processing error in regular operation. If there are three (or four) computing instances, the application data AD that is mostly identical can be used for a further processing, while the application data AD that differs therefrom is blocked for further processing. If only two computing instances are still available in regular operation as a 2oo2 system for the voting VTG, regular operation must be stopped on the occurrence of a further error in one of the two computing instances. Then, all computing instances RP1, RP2, RP3, RP4 must be initialized. However, then no state copy is created and no messages are stored because all computing instances have been excluded from the performance of the technical process in regular operation.

The processing of messages stored as application data sets ADS in repair operation takes place in parallel to the processing of the application data sets ADS of the computing instances RP1, RP2, RP3, as described above. Therefore, the currently changed application data set ADS of the computing instance RPn can likewise be taken into account in said voting step VTG. As soon as it is determined that the changed application data sets ADS of all computing instances RP1, RP2, RP3, RPn match within the synchronization window explained above, the computing instance RPn can be reintegrated into regular operation to perform the technical process so that it works in parallel to the computing instances RP1, RP2, RP3 (these then together form a 3oo4 system).

Figure 5:
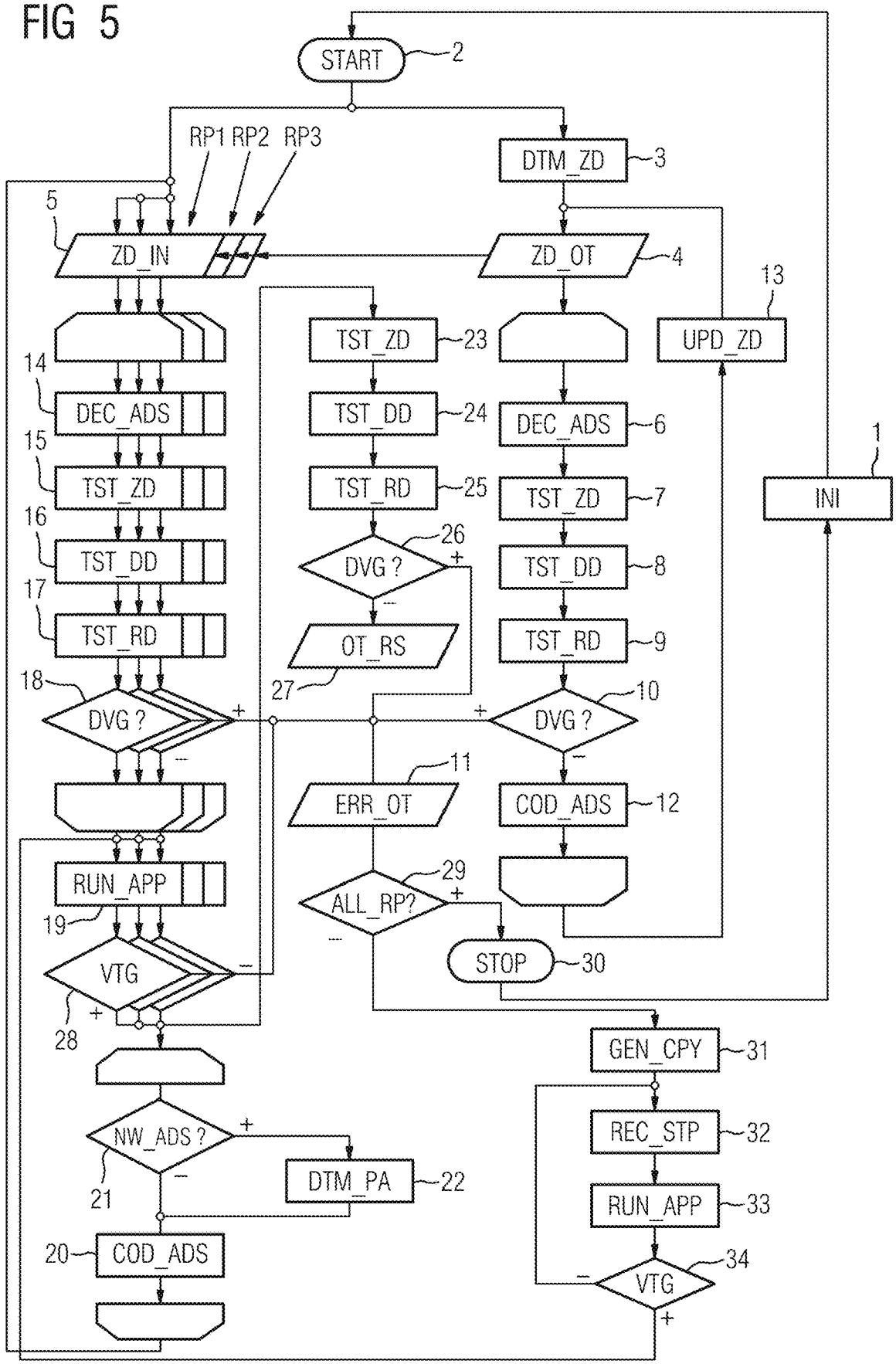
FIG. 5 shows an exemplary embodiment of the method according to the invention as a flow chart, wherein the method steps shown can be implemented individually or in groups by program modules and wherein the computing instances and interfaces according to FIG. 2 are indicated by way of example.

FIG. 5 is used to explain the possible course of the method for computer-aided operation of a memory unit and for computer-aided parallel execution of an application program with subsequent voting VTG. Before starting the method, an initialization step (step 1, INI for short) is performed, wherein this allows proper memory access to a memory unit (not depicted). After starting (step 2) the method, here, the method for performing test runs of the memory unit is performed on the top right and, in the top middle, the execution of application programs AP1 . . . . AP5 is performed in regular operation on the left and a repair operation at the bottom right. These sub-areas can be performed individually one after the other or preferably in parallel and are therefore depicted in a common flow chart.

The method for performing the test run will be explained first. In a determination step for the count data ZD (step 3, DTM_ZD for short), a start value is defined for the count data ZD. In an output step for count data ZD, this count data ZD is made available to the method for executing an application program (left-hand side) (step 4, ZD_OT) via an input step for count data ZD (step 35 ZD_IN for short) if required.

The actual test run consists of repeated procedures that are performed for all application data sets ADS that are stored in the memory unit (depicted on the right side in FIG. 5). The following is performed for each application data set ADS with the current counting elements of the count data ZD:

In a decoding step for the application data set ADS (step 6, DEC_ADS for short), the application data set ADS is decoded. In a test step for the count data ZD (step 7, TST_ZD for short), it is tested whether the counting element corresponds to the test run currently being tested or the last test run. In a test run for the diversity characteristic data DD1 . . . . DD4 (step 8, TST_DD for short), it is tested whether the application data set ADS has diversity characteristic data DD1 . . . . DD4 that corresponds to the available pool VR of diversity characteristic data DD1 . . . . DD4 (see FIGS. 3 and 4). In a test step for the redundancy data RD (step 9, TST_RD for short), it is tested whether the redundancy data RD has an expected value, in particular a default value, (optional).

Once all test steps have been performed, it is tested in a query step for divergences (step 10, DVG? for short) whether one of the test steps, as described above, has produced divergences from the expected result. If this is the case, an error is output in an output step for errors (step 11, ER_OT for short) (more on this below). If this is not the case, the tested application data set ADS is coded again in a coding step for the application data set ADS (step 12, COD_ADS for short), wherein this is always coded in the count data ZD with the counting element of the current test run. Hence, once the test run has been performed for all application data sets ADS, these have the current counting element in the count data ZD and the count data ZD can be updated in an updating step for the count data ZD (step 13, UPD_ZD for short) for the service program that is running in such a way that they now contain the counting element of the test run that is subsequently started.

In the method for computer-aided execution of an application program (left-hand side in FIG. 5), after the aforementioned input step 5 for the count data ZD, the decoding step for the relevant application data set ADS (step 14, DEC_ADS for short) is performed repeatedly for all required application data sets ADS of the application carried out by the application program. Then, as already described for the test run, a test steps are performed for the count data ZD (step 15, TST_ZD for short), the diversity characteristic data DD1 . . . . DD4 (step 16, TSD_DD for short) and the redundancy data RD (step 17, TSD_RD for short, optional).

The special feature is that the application is performed on three computing instances RP1, RP2, RP3 (not depicted) (see the computing instances in the first program package PK1 in FIG. 2) each with a different diversity, so that the diversity characteristic data DD1 . . . . DD4 tested in the test step for the diversity characteristic data DD1 . . . . DD4 (step 18, TSD_DT for short) must correspond exactly to the respective diversity of the relevant computing instance on which the application program is to be performed. The following steps, which are performed equally and preferably parallel in time in the three computing instances RP1, RP2, PR3 (more on the subsequent performance below), are therefore shown overlapping for the sake of clarity.

When the application program is executed, it is also tested for each required application data set ADS in test step 18 for divergences DVG? in each of the three computing instances RP1, RP2, RP3 whether the test steps TST . . . have identified divergences from the expected contents of the application data sets ADS. If this is the case, as already explained, an error is output in output step 11 for errors ERR_OT. Otherwise, the testing of application data sets ADS is continued until all application data sets ADS required for the application program have been tested. Only under this condition, is the application program executed in parallel to the other two (error-free) computing instances in an execution step for the application program (step 19, RUN_APP for short) in the relevant one of the three computing instances RP1, RP2, RP3.

The application data sets ADS can preferably be tested for the application program step-by-step for each message generated as a result (which is likewise contained in new or changed application data sets) (not depicted in detail in FIG. 5). This means the processing of the application program is divided into processing steps. In this sense, all the application data sets ADS required for the application program and generated by the application program are to be tested, each of which is required for the next step to be performed by the application program. In the execution step 19 for the application program RUN_APP, in each case the relevant step of the application program is then executed. For each application program, several recursion loops then result in FIG. 5 which, after the coding step for the application data set ADS (step 20, COD_ADS for short, on the left-hand side of FIG. 5) described below, lead back to the input step for the count data ZD.

The execution step is concluded by voting VTG (step 28) in which messages generated parallel in time by the three computing instances in the execution step, which must be identical at least with regard to the application data AD in the data section DA, are compared. If the voting VTG is positive, i.e. the majority of the messages is the same, this majority (i.e., two or three of the three results of the 2oo3 system depicted in FIG. 5) is released for the next step NW_ADS? (see below).

After the execution step for the application program RUN_APP, it is tested whether the application data sets ADS that exist after the execution of the application program are new application data sets ADS. This test (query step 21 for new application data set ADS, NW_ADS? for short) is required so that new application data sets ADS are assigned test data in a determination step for a test data section PA (step 22, DTM_PA for short), which enables a subsequent test TST . . . of the new application data set ADS in the further steps of the method presented. In each case, the new application data set ADS or also the old and changed application data sets ADS are coded again in the coding step 20 for application data sets ADS COD_ADS and saved in the memory unit. Then, a further application program or, as described above, a further step of a running application program can be performed (repetition of ZD_IN, input step for count data ZD and the subsequent steps).

The performance step 19 for the application program RUN_APP can also achieve results that are to be output as messages (preferably via the message broker MB, see FIG. 2). Before this happens, a test procedure, shown in the middle of FIG. 5, can likewise be run as an option. Here, the above-explained steps, i.e. test step for the count data ZD (step 23, TSD_ZD for short), the test step for the diversity characteristic data DD1 . . . . DD4 (step 24, TSD_DD for short) and (optionally) the test step for the redundancy data RD (step 25, TSD_RD for short) are performed. In a subsequent query step for divergences (step 26, DVG? for short) it is again tested whether divergences could be determined during the test steps. If this is the case, as already described, an error signal is generated in an output step 11 for errors ERR_OT. Otherwise, the result is output in an output step for the result (step 27, OT_RS for short) and/or further processed in further steps (for example in another program package according to FIG. 2).

In the event that an error is output in output step 11 for errors ERR_OT, in the exemplary embodiment according to FIG. 5, repair operation is started for the affected computing instance. This will be explained in more detail below.

If not all messages are assessed as equal in the voting VTG (step 28), but a majority of the messages is the same (i.e., two out of three in a 2oo3 system), repair operation is only started with the message that diverges from the two messages that are the same. If it is not possible to ascertain a majority of messages that are the same (i.e., three different messages in a 2oo3 system), repair operation is initiated for all messages. In each case, the output step for errors ERR_OT takes place. In a subsequent query step (step 29, ALL_RP? for short), it is tested whether all messages are intended for repair operation. If this is the case, the method for processing the application program is stopped (step 30, STOP for short) and all participating computing instances are reinitialized before being restarted.

In the event that the majority of the messages was identical, the above-described method for processing the application program (left-hand side of FIG. 5) continues, repair operation is started in parallel thereto (bottom right-hand side of FIG. 5). Therefore, in the example according to FIG. 5, the application programs AP1 . . . . AP5 continue to be processed with two computing instances in regular operation, while repair operation is initiated for one computing instance.

For the accompanying repair operation, first, a state copy of the application data sets ADS that are currently present and participating in regular operation is generated in a copying step (step 31, GEN_CPY for short). Since the affected computing instance is already excluded from regular operation, this state copy must be generated by the application data sets ADS of one of the computing instances that is still running. In a subsequent recording step (step 32, REC_STP for short), the application data sets ADS subsequently generated and changed by the selected computing instance that is still running are continuously copied and saved. As soon as the state copy has been written to the affected computing instance, it begins the subsequent processing (step 33, RUN_APP for short) of the application program. Herein, if necessary, the computing instance also uses the stored application data sets AD. After the performance of the in each case subsequent steps 33, voting VTG (step 34) takes place in the manner described. Herein, the message created in each case in repair operation is compared with messages generated in regular operation, which can, for example, lie within a synchronization window containing the last ten messages created.

If a match of the compared messages can be determined in the voting VTG, the affected computing instance is reintegrated into regular operation because this is evidence that this computing instance has made up for time lost in repair operation associated with the upload of the state copy. To increase the safety of the reintegration, it can also be provided that this only takes place if, for example, three successive messages could be identified as matching in the voting VTG.

The following is a summary list of reference numerals and the corresponding structure used in the above description of the invention:

AD Application data
ADS Application data sets
AP1 First application program
AP2 Second application program
AP3 Third application program
AP4 Fourth application program
AP5 Fifth application program
BL Balise
CL Controller
CLD Cloud
COD Coding process
DA Data section
DD1 First diversity characteristic data
DD2 Second diversity characteristic data
DD3 Third diversity characteristic data
DD4 Fourth diversity characteristic data
DEC Decoding process
GL Track
GR Group
GW Gateway
HR1 First host computer
HR2 Second host computer
HR3 Third host computer
KD1 . . . . KD13 Configuration data
KD1 First configuration data
KN Node
LS Light signal
LZ Control center
MB Message broker
PA Test data section
PK1 . . . . PK4 Program package
PK1 First program package
RD Redundancy data
RE Read process
RU Computing environment
RZ computer center
S1 First interface
S2 Second interface
S3 Third interface
S4 Fourth interface
S5 Fifth interface
S6 Sixth interface
S7 Seventh interface
S8 Eighth interface
S9 Ninth interface
S10 Tenth interface
S11 Eleventh interface
S12 Twelfth interface
S13 Thirteenth interface
S14 Fourteenth interface
S15 Fifteenth interface
SE1 First memory unit
SE2 Second memory unit
SE3 Third memory unit
STW Signal box
TG Clock generator
TG, VT, GW, MB Subprograms
VR Pool
VT Voter
VTG Voting
WA Switch drive WH Switch
WT Write process
ZD Count data

The invention claimed is:

1. A method for performing a technical process, the method comprising:
   a) executing application programs redundantly in a plurality N of computing instances; and
   b) in a voting process based on an MooN (M-out-of-N) voting system, wherein M is at least two and N is at least three, comparing the plurality N of results of the redundant execution of the application programs;
   c) when a minority of the results is different from a majority of the results with identical content, excluding the minority of the results from being taken into account during a performance of the technical process;
   d) in a case according to step c), excluding the at least one affected computing instance responsible for generating the minority of the results from the performance of the technical process;
   e) in the case according to step c), generating, by a computing instance affected by the generation of the majority of the results, a state copy of a status to be reinitialized, and storing all messages sent to the computing instances from the generation of the state copy and a sequence thereof;
   f) during a reinitialization, establishing a status of the affected computing instance according to the state copy and processing all stored messages in the stored sequence by the affected computing instance until the affected computing instance runs synchronously with the computing instances that are not affected by the reinitialization; and
   g) subsequently reintegrating the at least one affected computing instance into the performance of the technical process.

2. The method according to claim 1, which comprises:
   h) when a majority of results with identical content cannot be determined in the voting process, not taking the plurality N of results into account during the performance of the technical process;
   i) in a case according to step h), excluding the plurality N of computing instances from the performance of the technical process; and
   j) reinitializing the plurality N of computing instances, and restarting a redundant execution of the application programs.

3. The method according to claim 1, which comprises creating the state copy by a computing instance not affected by the reinitialization only as soon as the case according to step c) occurs.

4. The method according to claim 1, which comprises:
   storing a content of the results of the majority of computing instances from at least one preceding comparison step; and
   during a processing of the messages according to step f), comparing calculated results with at least one of the stored results in at least one comparison step downstream of the processing for synchronization.

5. The method according to claim 4, wherein the at least one preceding comparison step is one of at least preceding comparison steps.

6. The method according to claim 4, which comprises reintegrating the at least one affected computing instance into the technical process if a match between a respective stored result and an associated calculated result is determined in at least one downstream comparison step, performed in the sequence of the stored results.

7. The method according to claim 6, which comprises performing at least three successive subsequent comparison steps and reintegrating the at least one affected computing instance into the technical process if a match between the respective stored result and the associated calculated result is determined in the at least three downstream comparison steps.

8. The method according to claim 1, which comprises determining the sequence of the messages taking into account a time of sending the messages, and wherein the sequence corresponds to a chronological sequence of the sending of the messages.

9. The method according to claim 8, which comprises saving the time of sending the messages as a digital time stamp.

10. The method according to claim 1, which comprises sending and receiving the state copy and the messages by a message broker.

11. The method according to claim 10, which comprises operating the message broker with a publish-subscribe method.

12. The method according to claim 1, which comprises:
   k) retaining messages in application data sets containing data sections;
   l) performing the voting process with redundant data sections that have been changed identically several times as results; and
   m) in the case according to step c) not taking into account the application data sets that contain data sections causative for error identification during the performance of the technical process.

13. The method according to claim 10, which comprises: operating a memory unit of the computing instances by:
   n) filing application data sets in the memory unit and coding the application data sets before being filed;
   o) retrieving the application data sets from the memory and decoding the application data sets after retrieval; and
   monitoring the memory unit for errors by performing a chronological sequence of computer-aided test runs for the memory unit, and only starting the reinitialization of the affected computing instance according to step f) when at least one test run reveals that no errors are present.

14. The method according to claim 13, which comprises starting the reinitialization of the affected computing instance only when at least two successive test runs reveal that no errors are present.

15. The method according to claim 13, which comprises, when an error is determined in the test run, or in one of at least two test runs, performing the following:
   in the case according to step c), generating, by the computing instance affected by the generation of the majority of the results, a state copy of a status to be reinitialized, and storing all messages sent to the computing instances from the generation of the state copy and a sequence thereof;
   during a reinitialization, establishing the status of the affected computing instance according to the state copy and processing all stored messages in the stored sequence by the affected computing instance until the affected computing instance runs synchronously with the computing instances that are not affected by the reinitialization; and subsequently reintegrating the at least one affected computing instance into the performance of the technical process.

16. The method according to claim 13, which comprises: an initial coding of the data:
    p) generating or selecting at least one application data set containing data sections with application data for at least one of the application programs and test data sections;
    q) for each application data set, occupying the test data section by count data that identifies the test run being performed; and
    r) coding and filing each application data set; for testing the data in the test run to be performed after retrieving and decoding the application data sets, in each case:
    s) determining an error for an application data set if the count data does not identify either the test run being performed or the most recent test run that has been completed;
    t) occupying the test data section of the relevant application data section by count data that identifies the test run being performed if no error was determined; and
    u) coding and filing the relevant application data set again if no error was determined.

17. A non-transitory computer program product with program instructions for performing the method according to claim 1.

18. A provisioning apparatus for providing a non-transitory computer program product, comprising program instructions for performing the method according to claim 1 when the program instructions are executed on a computer system.

* * * * *